Aug. 23, 1927.  1,639,828
J. H. WHEELER ET AL
PROCESS FOR TREATING CHEESE
Filed Sept. 24, 1923
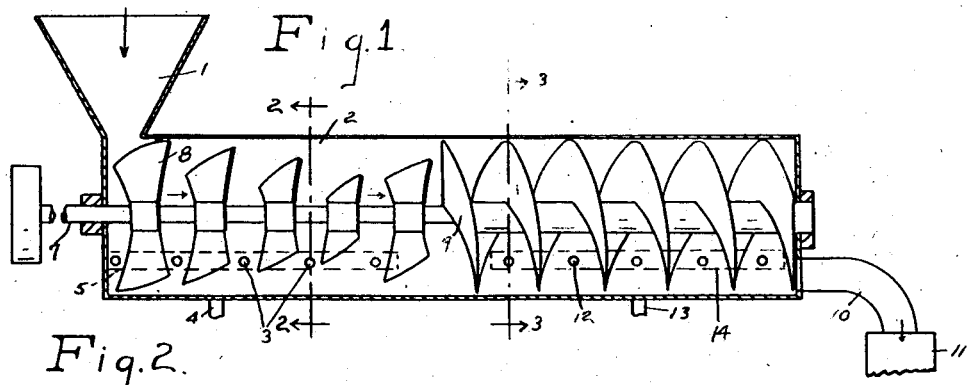
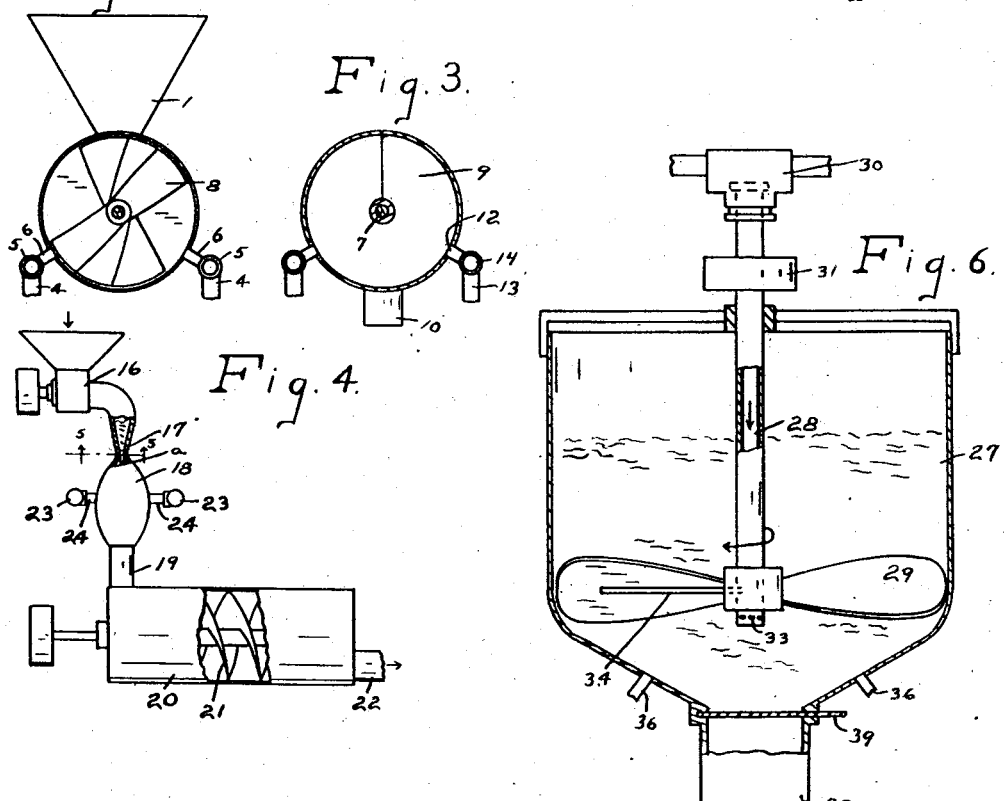
INVENTORS
John H. Wheeler
H. Murray Scott
BY
Erwin Schuler & Woolard
ATTORNEYS.

Patented Aug. 23, 1927.

1,639,828

UNITED STATES PATENT OFFICE.

JOHN H. WHEELER, OF PLYMOUTH, AND HENRY MURRAY SCOTT, OF WALDO, WISCONSIN, ASSIGNORS TO BROOKSHIRE CHEESE COMPANY, OF SHEBOYGAN, WISCONSIN.

PROCESS FOR TREATING CHEESE.

Application filed September 24, 1923. Serial No. 664,382.

Our invention relates to improvements in processes for treating cheese.

The objects of this invention are to provide means whereby cheese derived from differing sources or manufactured under differing conditions may be improved in quality, modified in characteristic flavor, and rendered homogeneous and sufficiently sterile to enable it to be packaged and kept without material deterioration through considerable periods of time.

A further object of this invention is to provide an improved method of heat treating cheese whereby the process may be continuously and expeditiously carried on under conditions of perfect sanitation, and whereby the results mentioned in the preceding paragraph may be more perfectly attained at less expense than by the heat treating processes heretofore followed.

The drawings illustrate various forms of apparatus which may be utilized in carrying out our improved process:

Figure 1 illustrates one form of apparatus in longitudinal section.

Figures 2 and 3 are cross sections thereof, taken respectively on lines 2—2 and 3—3 of Figure 1.

Figure 4 is a side elevation of another form of apparatus which may be employed for carrying out our improved process, parts being broken away to show the interior.

Figure 5 is a sectional view taken on line 5—5 of Figure 4.

Figure 6 is a view, partly in section and partly in elevation, showing a third form of apparatus adapted for our purposes.

Like parts are identified by the same reference characters throughout the several views.

In carrying out our process, we subject ground or comminuted cheese to the direct action of steam at a temperature sufficient to reduce the cheese to a thick, viscous, or liquid condition without breaking down the fat globules or causing a separation of the fats and casein. During this step in our improved process, the cheese may be stirred to prevent unequal heating in different portions of the mass and also to render the mass homogeneous. But agitation is not important if the steam as a heating agent is applied equally to all portions of the mass and if the ground or comminuted cheese to be treated is initially homogeneous in character. By subjecting ground or comminuted cheese to the direct action of steam under conditions which allow the steam to uniformly reach all portions of the cheese, it is possible to reduce the cheese to the desired viscous condition almost simultaneously and with uniform heat in all portions of the mass, and it is further possible to reduce the cheese to said viscous condition within an exceedingly short period of time. Experiments which we have conducted demonstrate that the quality of the product is improved in inverse proportion to the time during which the cheese is subjected to a melting or reducing temperature. Where the cheese is exposed to such temperature momentarily, its quality and flavor is not impaired, but on the contrary, is improved and is modified to a less degree from the original flavor and quality.

For fresh American cheese of the Cheddar type, a temperature of about 145° F. will be found sufficient to reduce the cheese to the viscous or semi-liquid form above described. Lighter cheeses require less temperature for their reduction, and increased temperatures are required for the heavier or more solid cheeses. The desired temperature in each case can be readily obtained by observation of the product, whereby it can readily be determined whether the cheese is sufficiently liquid to allow it to be mixed, or handled in a mixer, or poured into a receptacle or package under comparatively light pressure, slowly without pressure and more rapidly under light pressure.

After the cheese has been reduced to a liquid or viscous form, as above described, we preferably inject a quantity of carbon-dioxide throughout the mass in intimate relation to the cheese molecules. This can be accomplished by delivering the carbon-dioxide into the liquid or semiliquid cheese at numerous points of penetration, and also preferably by agitation. The cheese, while still warm and viscous or plastic, is then packed in suitable containers, such for example, as paper packages or wooden boxes, or any other suitable receptacles adapted to contain a definite quantity or weight of cheese in merchantable packages of commercially popular size.

Referring now to Figures 1, 2, and 3 of the drawings, the comminuted cheese to be treated in accordance with my process, is poured into a suitable hopper 1 from which it is delivered into a horizontally disposed cylindrical chamber 2 having a number of steam inlet ports 3 along its respective sides. Steam is conveyed to the chamber 2 through suitable mains 4, manifolds 5, and branch ducts 6. The ports 3 are preferably located below the longitudinal center line of the cylinder 2 and have an upward pitch corresponding with that of the ducts 6, whereby the steam will be discharged upwardly into the mass of cheese along inclined lines. Conveyor shaft 7 extends longitudinally of the cylinder 2, preferably at the axis thereof, and at the receiving end portion of the cylinder this shaft is provided with helical screw segments 8 which progressively advance the cheese toward the discharge end of the cylinder when the shaft is rotated in the proper direction. In the outlet end portion of the cylinder the shaft is preferably provided with a continuous helical blade 9 which progressively forces the cheese in the direction of the outlet, the latter comprising an opening in the lower portion of the cylinder head from which an elbow 10 extends in a position to deliver the product downwardly into the receptacle or package indicated at 11.

The outlet end portion of the cylinder 2 is preferably provided along each side and below the axis with a series of ports 12 through which carbon-dioxide is injected into the cheese from a main 13 and a manifold 14. The arrangement of the pipes may be substantially the same as that above described for delivery of steam into the mass of cheese. The carbon-dioxide is mixed with the cheese partly by reason of its injection into the semi-liquid or viscous mass under pressure, and partly by the agitation produced with the operation of the screw, the condensation of the steam forming numerous cavities which become filled with carbon-dioxide. Unabsorbed water of condensation will be pressed out or separated and will flow from the top of the package as the container fills.

If the structure disclosed in Figures 4 and 5 is employed, pieces of cheese may be fed through an ordinary grinder or so-called meat chopper 16, or any other device for grinding or comminuting the cheese and forcing it through a tube. The outlet of the chopper or grinder 16 is connected with an elongated nozzle 17, the form of which is best indicated in Figure 5. The cheese is pressed into conformity with this nozzle and passes into a chamber 18 in the form of a thin sheet, substantially as indicated at $a$, the cheese passing in the form of a belt or ribbon downwardly through this chamber to an outlet passage 19 at its lower end and into a conveyor chamber 20 where it is forced by a screw conveyor 21 through the packing outlet 22 into the containers. Steam is delivered into the chamber 18 through the pipes 23 and branch ducts 24, whereby both sides of the cheese belt or ribbon $a$ are exposed to steam. The ribbon is sufficiently narrow so that the cheese is almost instantly raised to the temperature of the steam in all portions thereof. The steam tends to pass upwardly into the shaping passage 17, the walls of which are also heated by conduction, whereby the cheese is softened and more readily compressed into the form of the ribbon as it enters the chamber 18.

In Figure 6 a mixing kettle 27 is illustrated, this kettle being similar in form to the kettles heretofore used for treating cheese in accordance with what is known as the batch method, except that the kettle is without a steam jacket such as heretofore been used for the purpose of heat treating cheese in batches. To enable us to use this kettle in the practice of our improved process, we employ a tubular shaft 28 to support the mixing blades 29, and the shaft 28 is rotatably connected with the steam main 30 to receive steam therefrom while the shaft is being rotated by means of a pulley 31. Steam is delivered through shaft 28 into direct contact with the cheese in accordance with our process as heretofore explained. The lower end of the shaft is provided with one or more openings 33 in its bottom and sides, whereby the steam may be delivered into the cheese in comparatively small jets, and branch ducts 34 may be employed to deliver steam laterally along the under surfaces of the mixing blades 29. Shaft 28 and mixing blades 29 are rotated to mix or stir the mass of cheese while the steam is being injected. Carbon-dioxide may be injected through suitable pipes or ducts 36 entering the bottom portion of the kettle 27.

With the construction shown in Figure 6, cheese may be continuously fed in at the top of the kettle and drawn or allowed to flow out at the bottom through an outlet duct 38. If it is desired to arrest the flow at any time, a slide valve 39 may be employed for that purpose, but owing to the fact that the steam is fed directly into the cheese and distributed throughout the mass by the steam jets and by the agitating paddles 29, it is possible to maintain the required temperature in the lower portion of the kettle, whereby the melting process, and if desired the carbon-dioxide charging process, may be completed as to any portion of the descending cheese before it reaches the outlet 38.

The carbon-dioxide is employed for the purpose of preserving the cheese and imparting a characteristic flavor or so-called "tang" thereto. The heat treatment has a slight sterilizing tendency, not sufficient to impair the quality of the cheese but sufficient to arrest or retard the multiplication of germs, and the carbon-dioxide adds to the effectiveness of such retardation. Owing to the viscous consistency of the cheese, and also owing to the fact that the packages or containers tend to retain gases, we find that the carbon-dioxide will be retained to a considerable extent through long periods of time, even though the packages are not hermetically sealed.

We find that by our improved process there is virtually no tendency for the cheese to adhere to the walls of the conveyor cylinder or receptacles through which the cheese is passed, whereas by the methods heretofore practiced, wherein the cheese is melted by transferring heat through the walls of the containers or crucibles, it is necessary to melt the cheese in batches and to scrape the kettles after every third or fourth batch has been run. This is due to the fact that the cheese melts in contact with the walls of the container, and notwithstanding the continuous agitation or stirring, it adheres to the walls thereof in an increasingly thickening layer, which becomes hard and dry as to those portions next to said walls.

It will, of course, be understood that in the practice of our improved process some of the particles of water will become entrained or imbedded in the cheese while other particles of the water or bodies of steam will be displaced by the carbon-dioxide.

We claim:

1. The process of treating cheese, which consists in feeding cheese in finely subdivided form continuously into the path of jets of steam, the temperature of which is sufficient to raise that of the cheese to a point where the cheese assumes a semi-liquid viscous condition.

2. The process of treating cheese, which consists in conveying comminuted cheese through a body of steam having a temperature sufficient to reduce the cheese to a semi-liquid mass, and simultaneously exposing substantially all portions of the cheese passing through the steam to direct contact with the steam.

3. The process of treating cheese, which consists in comminuting it and exposing the comminuted cheese momentarily to the direct action of steam having a sterilizing temperature.

4. The process of treating cheese, which consists in injecting multiple jets of heated steam into a body of cheese to raise the temperature of the cheese substantially to the liquefying point in the presence of the steam, and simultaneously moving the particles of cheese and steam to establish intimate contacts between such particles throughout the mass of cheese.

5. The process of treating cheese, which consists in exposing particles of comminuted cheese to direct contact with particles of heated steam and utilizing the steam to raise the temperature of the cheese to reduce it to a viscous semi-liquid mass.

6. The process of treating cheese, which consists in comminuting it and causing the comminuted cheese to pass in a substantially continuous stream from a feeding point to a container through a body of steam having a sterilizing temperature, and regulating the period of exposure to such steam in accordance with the time required to liquefy the variety of cheese so treated.

7. The process of treating cheese which consists in passing a stream of cheese through a chamber, admitting steam to said chamber at a temperature adequate to reduce particles of said cheese to substantially a liquid state immediately upon exposure of such particles to the steam, and momentarily exposing substantially all particles of said cheese to the steam.

8. The process of treating cheese, which consists in passing a stream of cheese through steam having a temperature adequate to reduce particles of cheese substantially to a liquid upon momentary exposure thereto, and exposing substantially all particles of said cheese momentarily to such steam and then immediately moving them out of contact therewith.

9. The process of treating cheese, which consists in exposing successive particles of cheese momentarily to a flowing jet of steam having a sufficient temperature to substantially liquefy such particles during such momentary exposure.

JOHN H. WHEELER.
H. MURRAY SCOTT.